A. J. CONNELLEY & T. BENJAMIN.
Improvement in Butter-Tubs and Coolers.
No. 127,742.             Patented June 11, 1872.
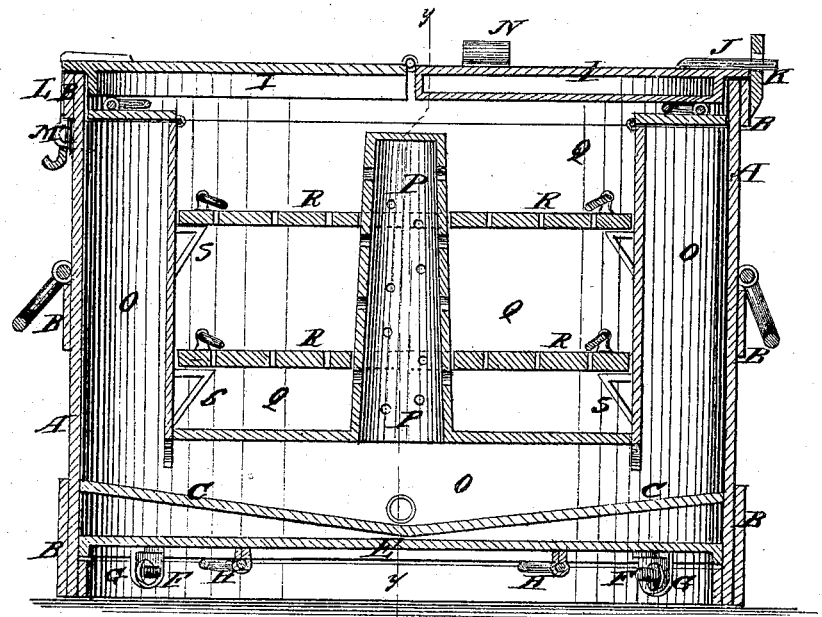
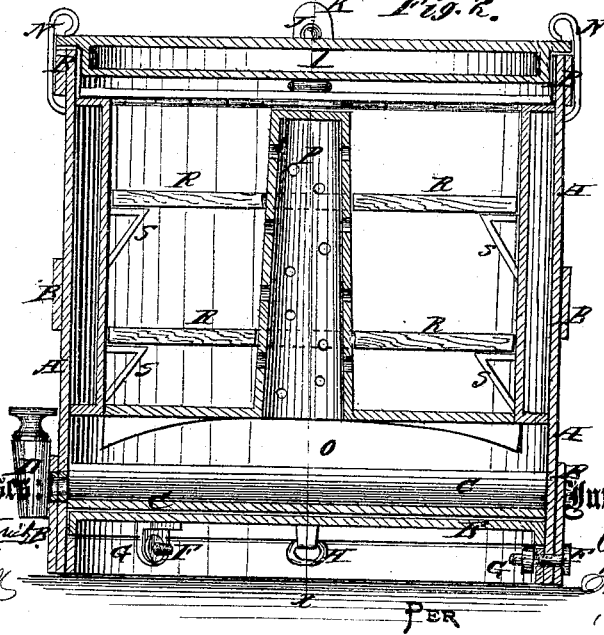

UNITED STATES PATENT OFFICE.

ARTHUR J. CONNELLEY AND THEODORE BENJAMIN, OF PHILADELPHIA, PA.

IMPROVEMENT IN BUTTER-TUBS AND COOLERS.

Specification forming part of Letters Patent No. 127,742, dated June 11, 1872.

Specification describing a new and useful Improvement in Combined Butter-Tub and Cooler, invented by ARTHUR J. CONNELLEY and THEODORE BENJAMIN, of Philadelphia, in the county of Philadelphia and State of Pennsylvania.

Figure 1 is a vertical longitudinal section of our improved butter-tub and cooler taken through the line $x\ x$, Fig. 2. Fig. 2 is a vertical cross-section of the same taken through the line $y\ y$, Fig. 1.

Similar letters of reference indicate corresponding parts.

Our invention has for its object to furnish an improved cooler for preserving and transporting butter, milk, lard, &c., and for other uses, which shall be simple in construction, inexpensive in manufacture, convenient in use, and effective in operation; and it consists in the construction and combination of the various parts, as hereinafter more fully described.

A is the body of the cooler, which is made oval in its general form, and is strengthened with hoops B. The bottom C is placed a little above the lower edge of the body A, and is made inclined so that the waste water may run off freely through the stop-cock D. E is a false or second bottom, which is secured in place by small bolts, F, which pass through the lowest hoop B, the body A, and a flange or lugs, G, formed upon or attached to the said bottom E. The bottom E is also provided with rings or other handles H, to enable it to be conveniently taken out when desired for the insertion of non-conducting material, repairs, &c. I is the cover, which is made in two parts, hinged to each other, as shown in Fig. 1. The parts of the cover I are made double, and in the space thus formed is placed some suitable non-conducting substance. The rear end of the cover I is secured in place by a pin, J, that passes through an eye, K, attached to the upper part of the body A. The forward end of the cover I is secured by a hasp, L, and staple M. The middle parts of the cover I are secured in place by spring-catches N, which take hold of it a little in the rear of the hinges, as shown in Figs. 1 and 2, so that the forward part may be used as a lid. O are chambers, formed in the end parts of the body A and above its bottom to receive the ice. The sides of the body A, between the end chambers O, are made double, and the space thus formed is filled with some suitable non-conducting material. P is a tapering tube, made with a close top and perforated sides, and the lower end of which opens into the bottom chamber O. The preserving-chamber Q thus formed is provided with perforated shelves or racks, R, which rest upon small cleats or brackets, S, attached to the walls of said chamber Q.

Having thus described our invention, we claim as new, and desire to secure by Letters Patent—

A butter-tub, consisting of case A, bottoms C E, two-part hinged cover I, ice-chamber O, and preserving-chamber P Q R, all arranged as and for the purpose set forth.

ARTHUR J. CONNELLEY.
THEODORE BENJAMIN.

Witnesses:
STEPHEN WILLIAMS,
ANDW. J. BOSWELL.